United States Patent
Sabourdy et al.

(10) Patent No.: US 10,367,325 B2
(45) Date of Patent: Jul. 30, 2019

(54) ACTIVE ELEMENT SLAB FOR A LASER SOURCE

(71) Applicant: COMPAGNIE INDUSTRIELLE DES LASERS CILAS, Orléans (FR)

(72) Inventors: David Sabourdy, Orléans (FR); Jean-Eucher Montagne, Orléans (FR); Alexandre Martins-Santana, Orléans-la-Source (FR); Luc Nguyen Duy, Antony (FR)

(73) Assignee: COMPAGNIE INDUSTRIELLE DES LASERS CILAS, Orléans (FR)

(*) Notice: Subject to any disclaimer, the term of this patent is extended or adjusted under 35 U.S.C. 154(b) by 0 days.

(21) Appl. No.: 15/976,032

(22) Filed: May 10, 2018

(65) Prior Publication Data
US 2018/0331487 A1 Nov. 15, 2018

(30) Foreign Application Priority Data
May 12, 2017 (FR) ..................................... 17 00512

(51) Int. Cl.
*H01S 3/06* (2006.01)
*H01S 3/0941* (2006.01)
(Continued)

(52) U.S. Cl.
CPC ............ *H01S 3/0606* (2013.01); *H01S 3/061* (2013.01); *H01S 3/0612* (2013.01);
(Continued)

(58) Field of Classification Search
CPC ...... H01S 3/0606; H01S 3/061; H01S 3/0612; H01S 3/0617; H01S 3/07; H01S 3/0941;
(Continued)

(56) References Cited

U.S. PATENT DOCUMENTS 8,514,906 B1 8/2013 Murray
2003/0161375 A1* 8/2003 Filgas ................ B23K 26/0648
372/66
(Continued)

FOREIGN PATENT DOCUMENTS

FR 2885267 A1 11/2006
WO 99/33150 A1 7/1999

OTHER PUBLICATIONS

Rapport de Recherche Preliminaire, mailed Mar. 22, 2018, issued in corresponding French Application No. 1700512, filed May 12, 2017, 2 pages.
(Continued)

*Primary Examiner* — Armando Rodriguez
(74) *Attorney, Agent, or Firm* — Christensen O'Connor Johnson Kindness PLLC

(57) ABSTRACT

An active element slab for a laser source is presented. The active element slab includes at least one input surface of a pump beam, a first section in the shape of an elongated bar along a longitudinal axis that includes a first doped matrix configured to absorb the beam pump to amplify a laser beam travelling longitudinally, a second section that covers at least partially the first section, the second section that includes a second doped matrix configured to absorb the laser beam and of being transparent to the pump beam.

16 Claims, 3 Drawing Sheets

(51) Int. Cl.
*H01S 3/07* (2006.01)
*H01S 3/16* (2006.01)
*H01S 3/094* (2006.01)

(52) U.S. Cl.
CPC ............ *H01S 3/0617* (2013.01); *H01S 3/07* (2013.01); *H01S 3/0941* (2013.01); *H01S 3/1611* (2013.01); *H01S 3/1615* (2013.01); *H01S 3/1643* (2013.01); *H01S 3/0615* (2013.01); *H01S 3/0625* (2013.01); *H01S 3/09408* (2013.01); *H01S 3/094096* (2013.01); *H01S 2301/02* (2013.01)

(58) Field of Classification Search
CPC .... H01S 3/1611; H01S 3/1615; H01S 3/1643; H01S 3/0625; H01S 2301/02
See application file for complete search history.

(56) References Cited

U.S. PATENT DOCUMENTS

2015/0161375 A1* 6/2015 Ghosh .................... G06F 21/36
726/7
2016/0326667 A1* 11/2016 Kolis .................... H01S 3/0612

OTHER PUBLICATIONS

Rapport de Recherche Europeenne mailed Sep. 26, 2018, issued in corresponding EP Application No. 18290047, 2 pages.

* cited by examiner

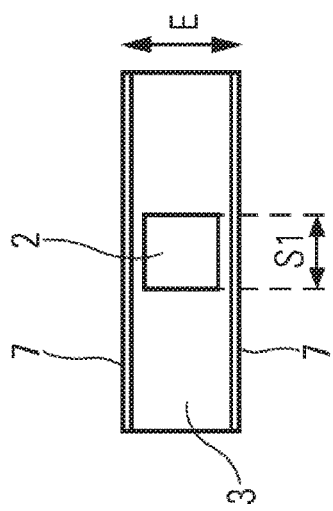
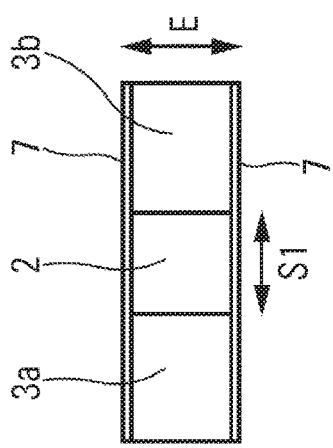
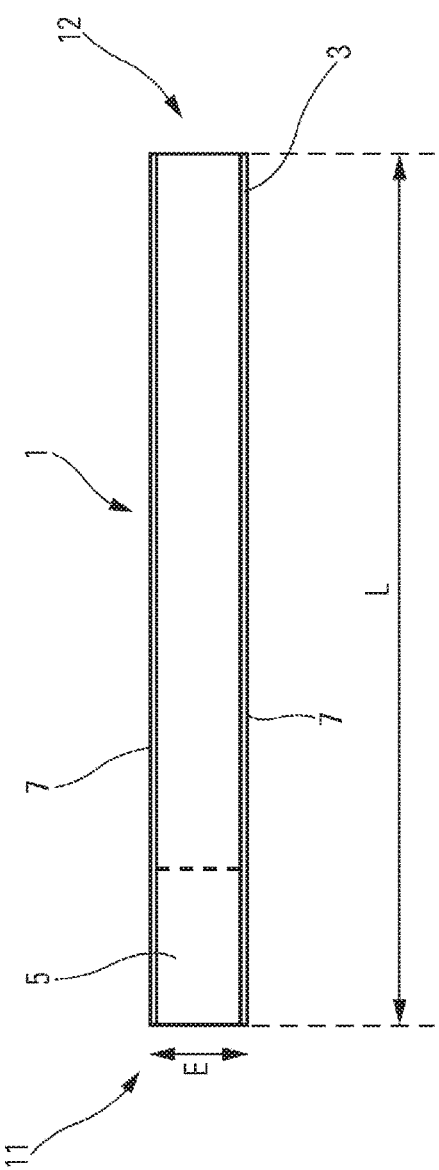
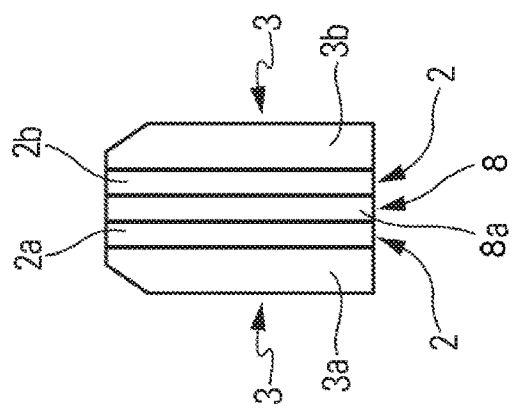

ACTIVE ELEMENT SLAB FOR A LASER SOURCE

TECHNICAL FIELD

Embodiments of the present disclosure relate to the field of slabs used in the active element for a laser source, and to a laser source containing such slabs.

BACKGROUND

Generally, a laser source includes a resonant cavity that contains an active laser medium. Stimulation of the active laser medium (or gain medium) is achieved by a pump beam emitted by a pump source. The pump beam enables a population inversion that is conducive to a stimulated emission generating the laser beam.

The compactness of a laser source is an important challenge when the said source is fitted in a device that has to remain compact. The size of the laser source can be a disadvantage when the device is portable.

Furthermore, when the device is subject to temperature variations, it is important that the laser source is not excessively affected by these variations. In the case of diode-pumped solid-state lasers, this last point is of critical importance considering that the central wavelength of laser diodes shifts by about 0.25 nm/° C. Depending on the profile of the absorption spectrum of the dopant ions under consideration, the energy of the laser can be affected.

For example, there are diode-pumped lasers called athermal lasers.

Generally, the principle of these sources is based on longitudinal pumping of doped amplifier bars. The pump is then guided in the bar, and the absorption length varies according to the operating temperature and the associated absorption coefficient.

Generally, the pump beam is emitted by a stack of diodes and collected by an optical device to be injected in the input of the amplifier bar.

For example, in the case of longitudinal pumping of a neodymium-doped yttrium aluminum garnet (Nd:YAG) crystal bar with a length of 80 mm, required for the absorption of at least 90% of the pump beam, the total length of the pumping and amplifier bar unit can reach 130 mm.

In this configuration, a significant part of the cavity length is governed by the size of the gain medium and the associated pump source generating the pump beam.

Although this type of solution is satisfactory, a more compact and efficient solution is preferable.

SUMMARY

The purpose of the embodiments of the present disclosure is to mitigate this disadvantage by offering a solution whereby a laser source with small size is achieved; a laser source with small size is less sensitive to temperature variations.

For this purpose, the embodiments of the present disclosure relate to an active element slab for a laser source.

An active element slab includes:
at least one input surface of a pump beam;
a first section in the shape of a bar extending longitudinally and including a first doped matrix configured to absorb the pump beam to amplify a laser beam travelling longitudinally; and
a second section, covering at least partially the first section, and including a second doped matrix configured to absorb the laser beam and of being transparent to the pump beam.

Thus, thanks to the matrix of the second section configured to absorb the laser beam, parasitic emission modes can be reduced and losses can be limited.

In one embodiment, the refractive index of the first doped matrix is substantially equal to the refractive index of the second doped matrix.

In one embodiment, the first doped matrix and the second doped matrix feature a refractive index that is greater than a refractive index of an environment in which the slab is likely to be used.

In one embodiment, the first doped matrix features a doping concentration that changes along the longitudinal axis such that the doping concentration at a first end of the first section close to the input surface(s) is not as high as the doping concentration at a second end, located further away from the input surface(s).

In another embodiment, the first doped matrix features a doping concentration that evolves radially, such that the doping concentration in a central area of the first section parallel to the longitudinal axis is greater than the doping concentration in the area located the furthest away from the central area.

In one embodiment, the first section is in the shape of an elongated bar that features a square cross section, the second section including two parts with rectangular cross sections between which the first section is sandwiched.

In another embodiment, the first section in the shape of an elongated bar features a circular cross section, with the second section including two semi-circular cross sections that embrace the shape of the first section sandwiched between the two parts of the second section.

In another embodiment, the second section is thicker than the first section.

In one configuration, the second section includes two pump beam input surfaces that are arranged symmetrically to the longitudinal axis of a first end of the slab, whereby both input surfaces are tilted in relation to the longitudinal axis.

In another configuration, the second section includes four pump beam input surfaces, whereby two pump beam input surfaces are arranged symmetrically to the longitudinal axis of a first end of the slab, and whereby two other pump beam input surfaces are arranged symmetrically to the longitudinal axis of a second end of the slab, all four input surfaces being tilted in relation to the longitudinal axis.

In one embodiment, the slab further includes at least one third section in the shape of an elongated bar running along the longitudinal axis, which includes a third doped matrix configured to absorb parasitic laser beam, the first section including two parts between which the third section is sandwiched.

In an embodiment, the first doped matrix includes a neodymium-doped yttrium-aluminum garnet crystal. Furthermore, the second doped matrix includes a samarium-doped crystal.

The disclosure also relates to a laser source that includes an active element slab for a laser source and at least one pump source configured to emit a pump beam that penetrates the active element slab.

In an embodiment, the active element slab of the laser source is of the type specified above.

In one embodiment, the pump source include at least one laser diode.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3a shows a view of the active element slab in a direction parallel to the longitudinal axis according to one embodiment;

FIG. 3b shows a view of the active element slab in a direction perpendicular to the longitudinal axis;

FIG. 3c shows a view of the active element slab in a direction parallel to the longitudinal axis according to another embodiment; and FIG. 4 shows a section of an active element slab according to one embodiment.

DETAILED DESCRIPTION

Figure 1:
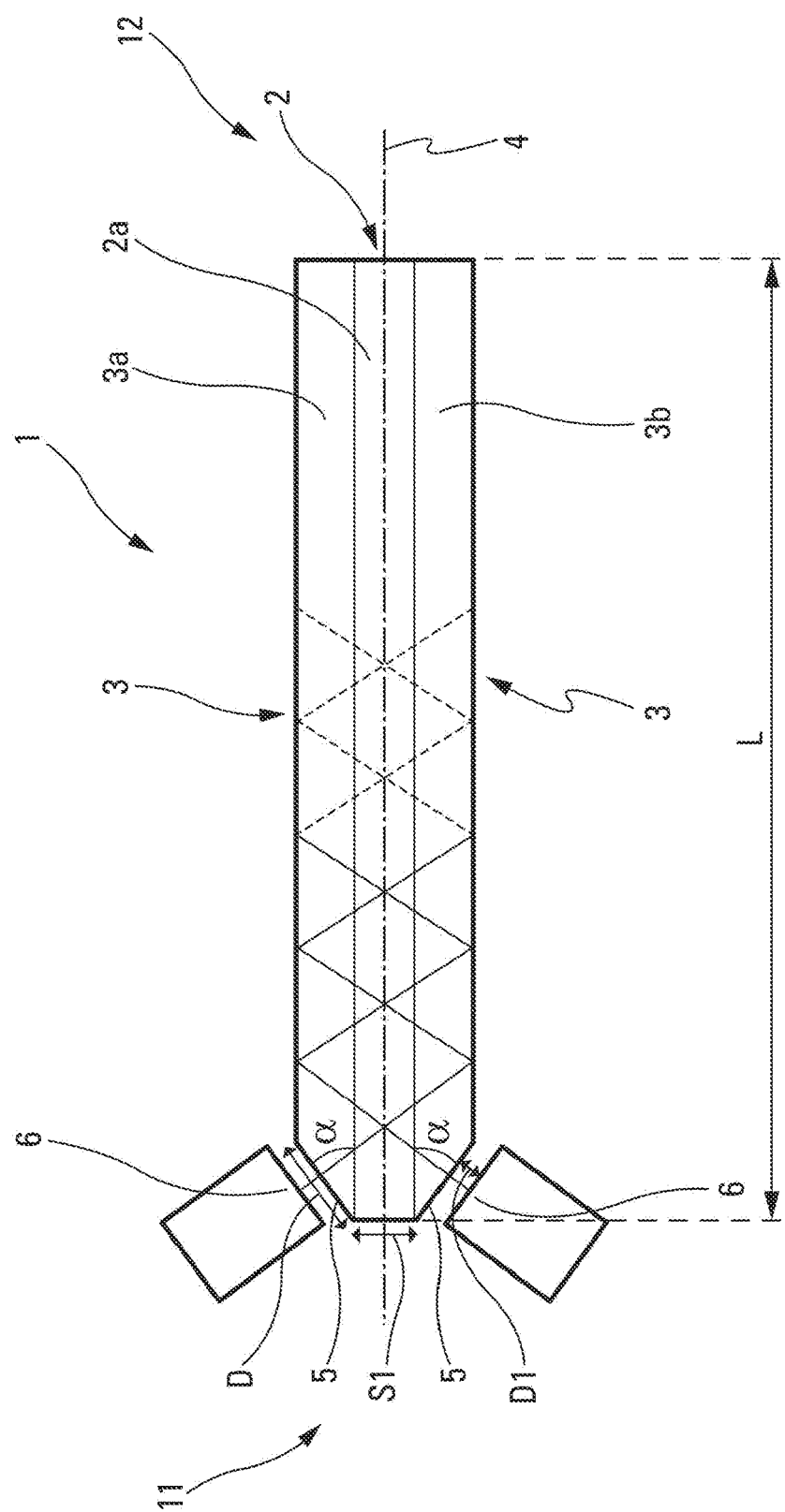
FIG. 1 shows an active element slab in one embodiment.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The disclosure relates to an active element slab 1 for a laser source. In this description, the active element slab 1 is also described as slab 1.

The active element slab 1 includes:

at least one input surface 5 for a pump beam, a first section 2 in the shape of an elongated bar running along a longitudinal axis 4. This first section 2 includes a first doped matrix 2a configured to absorb the pump beam to amplify a laser beam travelling along the longitudinal axis 4, a second section 3 that covers at least partially the first section 2, where the second section includes a second doped matrix 3a, 3b, which is configured to absorb the laser beam and of being transparent to the pump beam.

Therefore, the pump beam emitted by a pump source 6 specified below can penetrate in the first doped matrix 2a through the second doped matrix 3a, 3b, which is transparent to the pump beam. The pump beam, having penetrated in the first doped matrix 2a, can then be absorbed by the first doped matrix 2a. The first doped matrix 2a can then emit and amplify the laser beam that travels longitudinally to the bar (i.e., substantially along the longitudinal axis 4). The second doped matrix 3a, 3b is configured to absorb the laser beam in order to limit the apparition of amplified spontaneous emissions (ASE) and other parasitic emission modes.

Preferably, the absorption rate of the second doped matrix 3a, 3b is greater than 80%.

Advantageously, the first doped matrix 2a is doped by luminescent ions, such as the neodymium ion (Nd), the ytterbium ion (Yb), the erbium ion (Er), the thulium ion (Tm), the holmium ion (Ho), or any other luminescent ion.

In one embodiment, the first doped matrix 2a and the second doped matrix 3a, 3b feature refractive indexes that are higher than a refractive index of an environment in which slab 1 is likely to be used. This index step between the doped matrices 2a and 3a, 3b and the environment in which slab 1 is likely to be used serves to confine the pump beam in the slab 1.

In one version, the first doped matrix 2a features a doping concentration that evolves along the longitudinal axis 4. The doping concentration evolves so as to be less important at a first end 11 of the first section 2 close to the input surface(s) 5 than the concentration located at a second end 12, the furthest away from input surface(s) 5.

In another version, the first doped matrix 2a features a doping concentration that evolves radially so that the doping concentration in a central area of the first section 2 parallel to the longitudinal axis 4 is higher than the doping concentration in the area that is the furthest away from the central area.

Whether the concentration evolves radially or along the longitudinal axis, in both cases the doping concentration can evolve continuously. The doping concentration can also follow a discrete evolution, by steps or by concentration increments.

These two doping concentration evolution versions can be combined.

In one embodiment, the first section 2 is sandwiched between the second section 3. The second section 3 therefore includes two parts 3a, 3b, in between which the first section 2 is inserted.

In a preferred embodiment, the first section 2, in the shape of an elongated bar, features a square or rectangular cross section. The second section 3 includes two parts 3a, 3b with rectangular cross sections. The first section 2 is sandwiched between the two parts 3a, 3b. Without limitation, the square cross section of the first section 2 features a side S1 between 2 mm and 8 mm in length, preferably a length of 3.5 mm.

In another embodiment, the section in the shape of an elongated bar features a circular cross section. The second section 3 includes two parts 3a, 3b featuring semi-circular cross sections. The first section 2 is sandwiched between the two parts 3a, 3b of the second section 3 so that the convex circular side of each part 3a, 3b fits onto the circular shape of the first section 2. Without limitation, the circular cross section of the first section 2 has a diameter between 2 mm and 8 mm, preferably a diameter of 4 mm.

In another embodiment (FIG. 3c), the second section 3 has a thickness E that is greater than the thickness of the first section 2.

Without limitation, the square or circular cross section of the second section 2 has a side S1 that is equal to 3.5 mm, whereas the second section 3 has a thickness E of 5 mm.

Advantageously, the first section 2 is arranged centered in the second section 3, as shown in FIG. 3c.

Advantageously, two opposing surfaces that correspond to the surfaces that include the junction between sections 2 and 3 and that have the biggest dimensions are coated with a reflective layer, called guiding layer 7, as shown in FIG. 3. This guiding layer 7 serves to confine the pump beam in the first section 2 and the second section 3. Without limitation, the guiding layer 7 has a refractive index that is lower than the refractive index of the first doped matrix 2a and the second doped matrix 3a, 3b. Preferably, the guiding layer 7 features a refractive index lower than the refractive index of the first section 2. Without limitation, the refractive index of the guiding layer 7 is about 1.6. The guiding layer 7 can be applied to the said surfaces using thin film deposition techniques for example.

Advantageously, the active element slab 1 further comprises an absorbing layer (not represented) that covers, at least partially, the guiding layer 7. The absorbing layer is configured to absorb the laser beam or parasitic laser beam. The absorbing layer allows parasitic laser beam paths to be eliminated. The refractive index of the absorbing layer is close or equal to the refractive index of the guiding layer 7.

Advantageously, these surfaces can be used as interfaces between slab 1 and heat sinks for thermalizing the active laser medium.

Without limitation, for a dual wavelength pump beam emitting at 801 nm and 806 nm, slab 1, whose second section 3 includes a Nd-doped YAG crystal, has a length L between 45 mm and 65 mm, preferably a length of 60 mm. This length L allows for the absorption of more than 80% of the pump beam in the first doped matrix 2a for an operating temperature range of around 100° C.

In a first preferred embodiment, as shown in FIG. 1, the second section 3a, 3b includes at least one input surface 5 of the pump beam at the first end 11 of slab 1. Preferably, the second section 3a, 3b includes at least two input surfaces 5. The two input surfaces 5 are arranged symmetrically in relation to the longitudinal axis 4. They are also tilted in relation to this longitudinal axis 4. The tilt angle α is such that the pump beam penetrating in slab 1 is guided by total internal reflection and completes at least two passes in the first section 2. The pump beam is thereby trapped in slab 1 and is absorbed by the first doped matrix 2a of the first section 2 in the course of its propagation.

Figure 2:
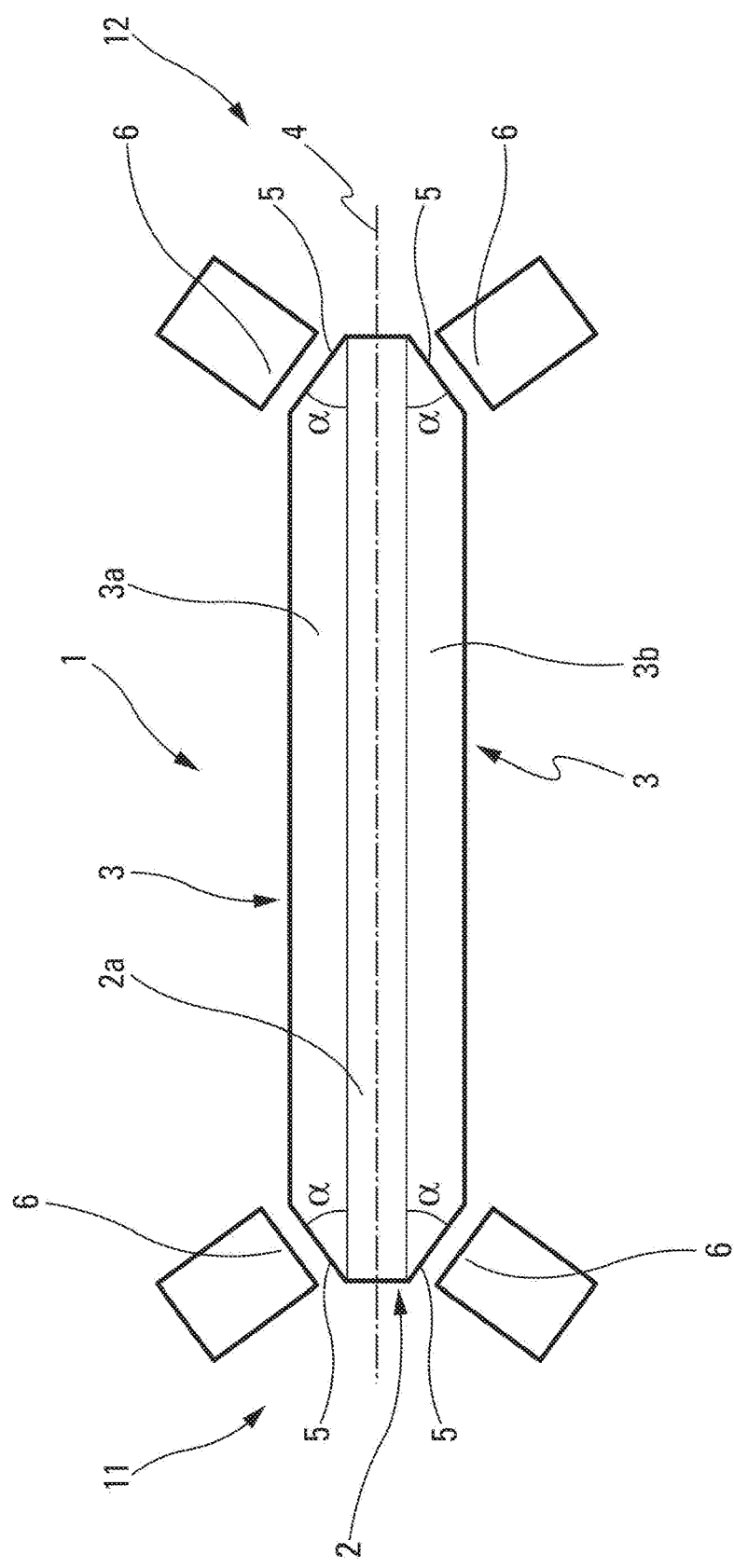
FIG. 2 shows an active element slab in another embodiment.

In a second embodiment, as shown in FIG. 2, the second section 3 includes four input surfaces 5 of the pump beam. Two input surfaces 5 of the pump beam are arranged symmetrically to the longitudinal axis 4 of the first end 11 of slab 1. Two other input surfaces 5 of the pump beam are arranged symmetrically to the longitudinal axis 4 of the second end 12 of slab 1. The four input surfaces 5 are tilted in relation to the longitudinal axis 4. In a preferred version, the tilt angle α of the two input surfaces at the first end 11 of slab 1 is equal to the tilt angle α of the two input surfaces 5 at the second end 12 of slab 1. In another version, the tilt angle α of the two input surfaces 5 at the first end 11 of slab 1 is not the same as the tilt angle α of the two input surfaces 5 at the second end 12 of slab 1. According to a preferred version, the tilt angles α of the input surfaces 5 of one end are equal. In another version, the tilt angles α of the input surfaces 5 of one end are not equal.

Without limitation, the tilt angle α is between 35° and 45°, preferably 40°. This angle is suitable in the case of a slab 1 made of YAG, with a second section 3 in contact with an environment whose refractive index is substantially equal to 1.

Without limitation, the dimensions of each input surface 5 feature a width that is substantially equal to the thickness E of slab 1 (FIGS. 3a and 3b), and a length D contained within a range from 5 mm to 12 mm, preferably 6 mm (FIGS. 1 and 3b), depending on the type of diodes used. To optimize the absorption of the pump beam in the first doped matrix 2a, a length D of 5 mm is preferred. The length D depends on the dimension of the pump source. For example, for a given pump source size, the length D of the input surface 5 corresponds to the size of the pump source increased by 1 mm.

In one embodiment, the first doped matrix 2a includes a neodymium-doped yttrium-aluminum garnet.

Without limitation, the first doped matrix 2a features neodymium ion doping between 0.1% and 1%, preferably 0.5%.

In another embodiment, the second doped matrix 3a, 3b includes a samarium-doped crystal. This samarium doping allows for an efficient control of parasitic emissions, such as amplified spontaneous emissions.

Without limitation, the second matrix 3a, 3b is doped with samarium at a rate between 1% and 15%, preferably 5%. Doping at 5% generates absorption greater than 2 cm$^{-1}$ at 1064 nm, and no absorption on the wavelength range between 750 nm and 850 nm.

With a slab 1 with a first doped matrix 2a that includes a neodymium-doped yttrium-aluminum garnet and a second doped matrix 3a, 3b that includes a samarium-doped crystal, it is possible to achieve an absorption rate of the pump beam by the first doped matrix 2a of approximately 77% at −30° C., a rate of 90% approximately at 20° C. and a rate of 87% approximately at 70° C.

Because of the transverse component of the pump beam, the ion doping is preferentially adjusted so that the gain integrated in the length of the bar is homogeneously distributed and does not generate excessive intensity on the sides of the bar. The distribution can be adjusted with a multi-wavelength pump beam.

In one embodiment, sections 2, 3 of the slab 1 are manufactured with a ceramic process.

In another embodiment, the sections 2, 3 of the slab 1 are manufactured with single crystals. In this embodiment, the first section 2 will have to adhere to the second section 3 with the risk of the presence of a certain quantity of micro defects per surface unit at the interfaces.

According to one embodiment (FIG. 4), the slab 1 comprises the first section 2 configured to amplify the laser beam travelling longitudinally and the second section 3 configured to absorb parasitic laser beam radiations. Slab 1 further includes at least a third section 8 in the shape of an elongated bar along the longitudinal axis 4 that includes a third doped matrix 8a configured to absorb the parasitic laser beam. The first section 2 includes two parts 2a, 2b in between which the third section 8 is sandwiched. According to a first variant (FIG. 4), the third section 8 in the shape of an elongated bar with a square cross section. The first section 2 includes two parts (2a, 2b) with rectangular cross sections in between which the third section 8 is sandwiched. According to a second variant, the third section 8 in the shape of an elongated bar has a circular cross section. The first section 2 includes two parts 2a, 2b with semi-circular cross sections that embrace the shape of the third section 8, which is sandwiched between the two parts 2a, 2b of the first section 2.

Preferably, the third section 8 is of the same type as the second section 3 with a third doped matrix 8a featuring the same doping as the second doped matrix 3a, 3b. This forms a slab that includes a set of several active laser mediums separated by one or several doped or non-doped areas.

Slab 1, such as described above, can be integrated in a laser source.

Thus, the laser source (not shown here) includes:

an active element slab 1 for a laser source of the same type as that described above; and at least one pump source 6 configured to absorb emit a pump beam penetrating in the active element slab 1.

In a preferred embodiment, the pump source(s) 6 include at least one laser diode. Preferably, the pump source(s) 6 include at least one stack of diodes. Preferably, the dimensions of input surfaces 5 are adjusted to the surface of the diode stacks.

Different diode stacks can be implemented, such as small bars of 10 mm, 5 mm or 3 mm.

Preferably, the laser source includes two stacks of diodes that are made of a plurality of small bars of 5 mm in width.

This generates a potential peak power of several kilowatts. Without limitation, these small bars feature multi-wavelengths. For example, they can have dual wavelengths at 801 nm and 806 nm, or tri-wavelengths at 793 nm, 807 nm and 809 nm. Furthermore, the gap between each small bar in a stack of diodes lies between 150 μm and 1.6 mm, depending on the manufacturers and specific requirements.

Advantageously, the emitting surfaces of pump sources are located at a distance D1 from each input surface 5 of the second section 3. Without limitation, the distance D1 is substantially equal to 500 μm.

Therefore, and without limitation, the laser source can have a length reaching approximately 73 mm; this generates a length gain of 1.78 compared with athermal laser designators.

This description details various embodiments, making reference to figures and/or technical features. A person skilled in the field will understand that, unless it is specifically stated otherwise, the various technical features associated with the different modes can be combined to achieve other embodiments, as long as such technical features are not incompatible. Furthermore, and unless it is specifically stated otherwise, a technical feature of an embodiment can be isolated from the other technical features in the said embodiment. In order to accurately describe the embodiments of the present disclosure, many specific details are provided for illustrative purposes and are not limited thereto. A person skilled in the field will however understand that the disclosure can be implemented without one or several specific details or in different versions. In other instances, some aspects have not been detailed, in order to avoid muddying or overburdening this description, and any person versed in the domain will understand that different and varied means can be implemented and that the disclosure is not limited to the examples described herein.

It should be obvious to any person knowledgeable in the field that this disclosure allows for embodiment in many other specific forms, without being too withdrawn from the scope of application as claimed herein. Consequently, these embodiment should be considered as examples that can be modified within the scope defined in the appended claims, and the disclosure should not be limited to the details provided above.

The invention claimed is:

1. An active element slab for a laser source, comprising:
   at least one input surface of a pump beam;
   a first section in the shape of an elongated bar along a longitudinal axis that includes a first doped matrix configured to absorb the pump beam to amplify a laser beam travelling longitudinally;
   a second section that covers, at least partially, the first section, where the second section includes a second doped matrix that is configured to absorb the laser beam and is transparent to the pump beam; and
   a third section in the shape of an elongated bar along the longitudinal axis, which includes a third doped matrix that is configured to absorb parasitic laser beam, the first section including two parts between which the third section is sandwiched.

2. The slab according to claim 1, wherein the first doped matrix features a refractive index substantially equal to a refractive index of the second doped matrix.

3. The slab according to claim 1, wherein the first doped matrix and the second doped matrix feature refractive indexes that are greater than a refractive index of an environment in which the slab is likely to be used.

4. The slab according to claim 1, wherein the first doped matrix features a doping concentration that changes gradually along the longitudinal axis such that the doping concentration at a first end of the first section close to the at least one input surface is less absorptive than the doping concentration at a second end, which is further away from the at least one input surface.

5. The slab according to claim 1, wherein the first doped matrix features a doping concentration that changes gradually radially such that the doping concentration in a central area of the first section parallel to the longitudinal axis is more absorptive than the doping concentration in an area furthest away from the central area.

6. The slab according to claim 1, wherein the first section in the shape of an elongated bar features a square cross section, and the second section comprises two parts with rectangular cross sections between which the first section is sandwiched.

7. The slab according to claim 1, wherein the first section in the shape of an elongated bar has a circular cross section, and the second section includes two parts with semi-circular cross sections that embrace the first section, which is sandwiched between the two parts of the second section.

8. The slab according to claim 1, wherein the second section has a thickness that is greater than a thickness of the first section.

9. The slab according to claim 1, wherein the second section includes two input surfaces of the pump beam arranged symmetrically to the longitudinal axis at a first end of the slab, where the two input surfaces are tilted in relation to the longitudinal axis.

10. The slab according to claim 1, wherein the second section includes four input surfaces of the pump beam, where two input surfaces of the pump beam are arranged symmetrically to the longitudinal axis at a first end of the slab and two input surfaces of the pump beam are arranged symmetrically to the longitudinal axis at a second end of the slab, the four input surfaces being tilted in relation to the longitudinal axis.

11. The slab according to claim 1, wherein the first doped matrix comprises a neodymium-doped yttrium-aluminum garnet crystal.

12. The slab according to claim 1, wherein the second doped matrix comprises a samarium-doped crystal.

13. The slab according to claim 1, wherein the slab comprises at least a guiding layer that coats two surfaces that correspond to the surfaces that include the junction between the first section and the second section and that have the biggest dimensions, the guiding layer having a refractive index that is lower than the refractive index of the first doped matrix and the second doped matrix.

14. The slab according to claim 13, wherein the slab further comprises an absorbing layer that covers, at least partially, the guiding layer, the absorbing layer being configured to absorb the laser beam.

15. A laser source that includes:
   an active element slab for a laser source; and
   at least one pump source configured to emit a pump beam penetrating the active element slab,
   wherein the active element slab is of the same type as that specified under claim 1.

16. The laser source according to claim 15, wherein the at least one pump source includes at least one laser diode.

* * * * *